United States Patent [19]

Touchton et al.

[11] 4,326,226
[45] Apr. 20, 1982

[54] CONSTANT BANDWIDTH AUTOMATIC GAIN CONTROL

[75] Inventors: James J. Touchton, Boulder; Richard J. Pederson, Louisville, both of Colo.

[73] Assignee: Storage Technology Corporation, Louisville, Colo.

[21] Appl. No.: 147,724

[22] Filed: May 8, 1980

[51] Int. Cl.³ .................. G11B 21/10; G11B 5/02
[52] U.S. Cl. ........................................ 360/77; 360/67
[58] Field of Search .......................... 360/77, 67, 46

[56] References Cited

U.S. PATENT DOCUMENTS 4,172,267 10/1979 Sidman .................................. 360/77

*Primary Examiner*—Vincent P. Canney

*Attorney, Agent, or Firm*—Woodcock, Washburn, Kurtz, Mackiewicz & Norris

[57] ABSTRACT

An improved automatic gain control circuit suitable for use in the servo loop controlling the position of magnetic read/write heads with respect to magnetic disk data storage media is disclosed. The AGC circuit features a fast loop and a slow loop each of which loops contain gain varying elements, which in the preferred embodiment comprise field effect transistors. By using a reference voltage to control the operating point of the variable gain element in the fast loop, the effects of mechanical resonances on the servo data can be substantially eliminated while the overall AGC system response exhibits a substantially constant bandwidth.

10 Claims, 5 Drawing Figures

CONSTANT BANDWIDTH AUTOMATIC GAIN CONTROL

FIELD OF THE INVENTION

This invention relates to a method of automatic gain control. In particular, this invention is described with reference to an automatic gain control used in a servo system controlling the position of the read/write head of a rotatable magnetic disk storage system.

BACKGROUND OF THE INVENTION

In the prior art, automatic gain control has been used in the head positioning servo loop of a magnetic disk storage system. The servo system uses prerecorded head position information on one surface of a stack of rotating magnetic platters to generate a regular signal for control. The information is read from a servo head flying above the servo surface. As the servo head is mechanically ganged to data heads flying over the other surfaces of the stack of rotating magnetic platters via a carriage mechanism, the servo position information indicates the position of the data heads. The head position information must be amplified, filtered and decoded (or peak detected) to provide a position error signal used to drive a linear motor attached to the carriage mechanism such that the data heads are correctly positioned over their respective data cylinders. An automatic gain control is used in the head positioning servo decoding system to remove signal amplitude variations due to media variations, head variations, amplification variations and flying height variations which otherwise cause inaccurate head positioning.

The bandwidth or response time of the automatic gain control is the ability to follow a time varying input signal. One such time varying signal is that of vertical mode instability or mechanical resonance of the servo head itself. As the servo head moves up and down with respect to the disk, the output signal from the head changes in amplitude because the output amplitude of the servo head is a function of its flying height. Thus, if the automatic gain control had a bandwidth or response time in excess of the frequency of the vertical mode instability, the amplitude variations would effectively be removed. However, this solution would also prevent the system from operating on the servo data.

OBJECTS OF THE INVENTION

It is accordingly an object of the invention to provide a constant bandwidth automatic gain control circuit for a magnetic disk storage system.

A further object of the invention is to provide an automatic gain control circuit which is not affected by variations in its input amplitude due to mechanical resonances in the system which it is used to control but which maintains sufficient bandwidth to provide useful servo control.

A further object of the invention is to provide a constant bandwidth automatic gain control which is substantially unaffected by nonlinearities in the components used to make up the circuit.

Still a further object of the invention is to provide constant bandwidth automatic gain control which is substantially insensitive to its incoming signal level and to nonlinearity in its variable gain element but which can be implemented with relative ease and at little expense.

SUMMARY OF THE INVENTION

The above listed objects of the invention and needs of the art are satisfied by the present invention which provides a constant bandwidth automatic gain control which has a response time that is insensitive to the incoming signal level and to nonlinearities in the response of the variable gain elements used to provide variable gain to the circuit. This is accomplished by providing first and second servo loops, one fast and one slow, each comprising a variable gain element and appropriate filtering so that substantially low frequency variations in the signal are corrected for in accordance with the object of accurate control of a magnetic head but high frequency instabilities in the signal due to servo loops are separately controlled in a loop having a much faster response time. In this way, the mechanical resonances are precluded from affecting the accuracy of the servo positioning of the head.

BRIEF DESCRIPTION OF THE DRAWINGS

The invention will be better understood if reference is made to the accompanying drawings, in which.

DESCRIPTION OF THE PREFERRED EMBODIMENTS

Figure 1:
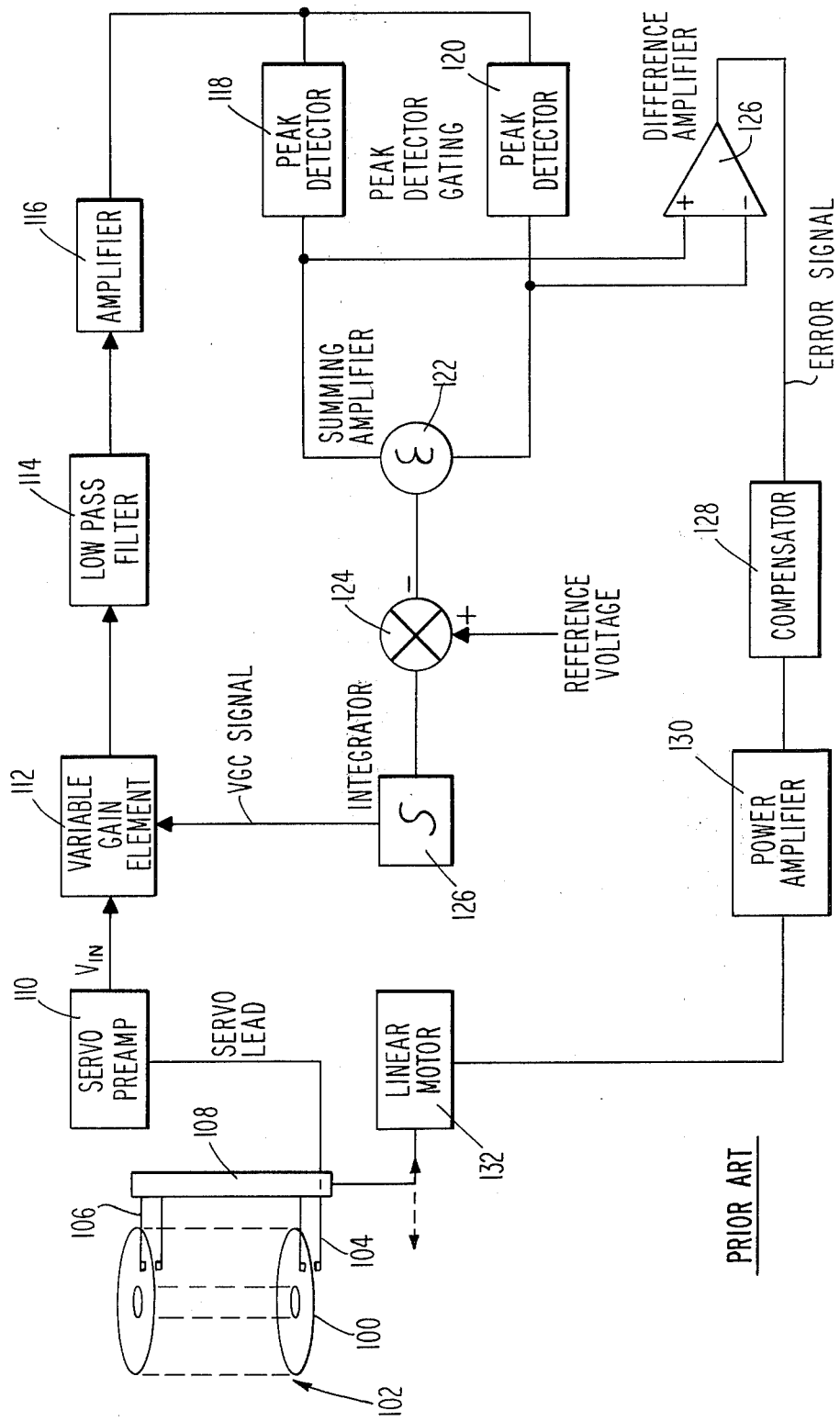
FIG. 1 represents a block diagram of a typical prior art automatic gain control circuit.

Reference will now be made to FIG. 1, which as mentioned above is a diagram of a prior art servo system.

Servo information is taken from lower most disk 100 of a disk pack indicated generally at 102 by a read head 104 which is ganged to a plurality of data read heads 106 by means of a carriage 108. The data is written and read in any conventional manner; this does not relate to the present invention. The servo data is passed to a servo preamp 110 which amplifies it; it is then passed to a variable gain element 112. The replacement of the variable gain element 112, which amplifies the signal from the servo preamp to an essentially constant level to enable accurate servoing of the movement of the carriage 108 with respect to the disks 102 is the subject of this application.

The signal from the variable gain element 112 is then passed to a low pass filter 114 and a buffer amplifier 116 and then to a pair of peak detectors 118, 120 which are gated to be out of phase so that their combined output, when applied to a summing amplifier 122, provides an average of the peak height of alternate pulses which are supplied from the amplifier 116. The output of the summing amplifier 112 is thus an average of the height of the amplified and filtered servo data. This is then compared in a comparator 124 with a reference voltage supplied according to the teachings of the prior art. The output from this element is then integrated in an integrator stage 126 which generates the control voltage signal used to operate the variable gain element 112. In this way a servo loop is provided for variable gain of the servo signal so that the amplitude of the servo signal is maintained at a substantially constant level. The gain-controlled servo signal is accordingly also passed from the peak detectors 118 and 120 to a difference amplifier 126 which measures the difference between even and odd servo pulses. This amounts, of course, to a signal indicative of whether the servo head velocity is increasing or slowing down. The output of the difference amplifier 126, therefore, comprises a position error signal which can be passed to a compensator 128 and thence to a power amplifier 130 which in turn provides the power to the linear motor 132 which moves the carriage 108 and the heads, including both read/write heads 106 and the servo data head 104 back and forth with respect to the disk pack 102.

It will be appreciated that the system described above provides automatic gain control to the servo signals of a servo system used to control the position of read/write heads with respect to the disk pack. The bandwidth of this system is its ability to follow a time varying input signal. It will be appreciated that the signal varies both as the speed of the carriage varies with respect to the disk pack and also if the head 104 from which the servo signals are derived moves with respect to the disk pack 102. The heads which are used in magnetic disk storage drives are extremely delicate assemblies which fly only a few millionths of an inch above the surface of the data storage disk and, accordingly, are somewhat susceptible to high frequency mechanical resonances. If these resonances are of a frequency outside the bandwidth of the AGC loop, servo head positioning is inaccurate. As discussed above, it is important, therefore, that the automatic gain control circuit not be affected by these resonances.

Figure 2:
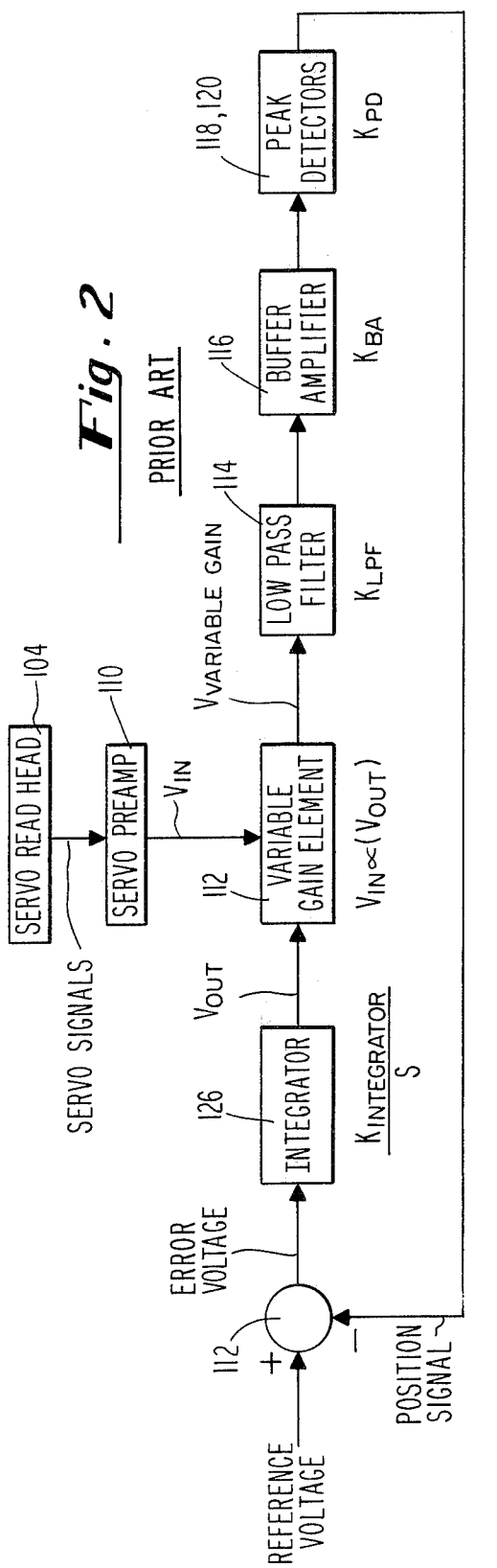
FIG. 2 represents a diagram useful in analyzing the bandwidth of the prior art automatic gain control.

The bandwidth of the prior art automatic gain control can be analyzed through the use of FIG. 2. Since the corner frequency of the low pass filter is high in comparison to the bandwidth of the automatic control loop, it can be ignored and the loop gain of the system can be simplified to that of a first order system. The loop gain of the system is then simply the product of multiplication of the individual gain of each of the elements of the loop or:

Equation 1: (1)

$$\text{Gain} = \frac{V_{in} \alpha \, K_{LPF} K_{BA} K_{pd} K_i}{S}$$

where:
$V_{in}$ = output of the servo preamp 110;

$$\alpha = \frac{\Delta \text{gain of variable gain element 112}}{\Delta V_{out}};$$

Figure 3:
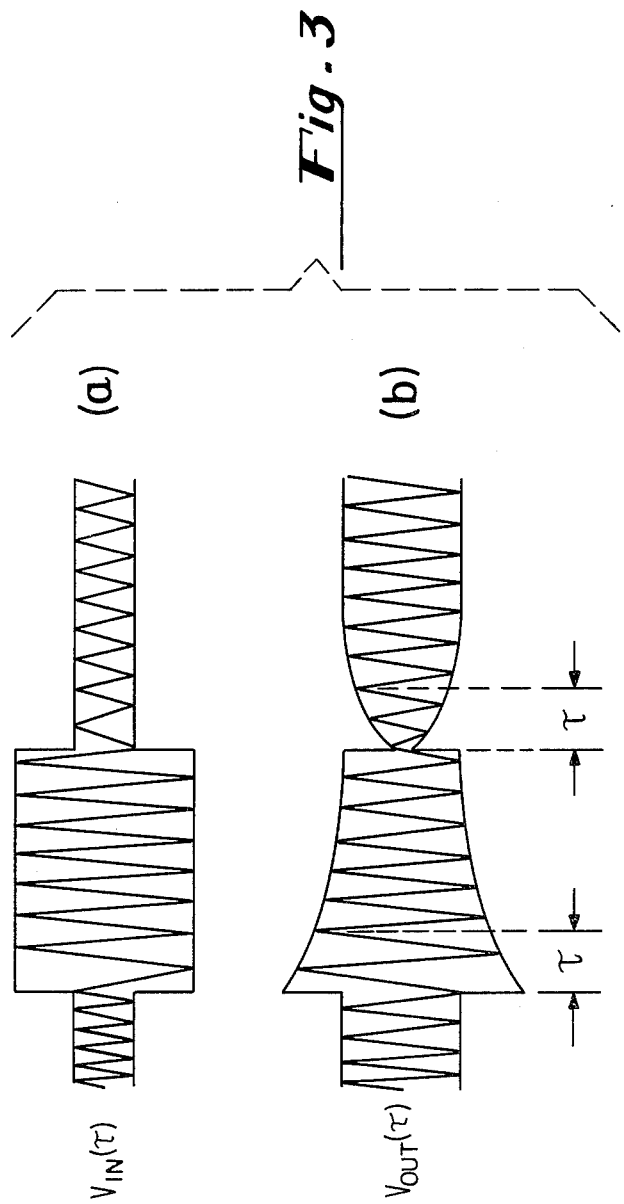
FIG. 3, including a and b, shows a graphical representation of system reponse.

$K_{LPF}$ = gain of filter 114;
$K_{BA}$ = gain of buffer amp 116;
$K_{pd}$ = gain of peak detectors 118, 120; and $K_i$ = gain of integrator 126.
$S = j\omega$ It will be appreciated that the response time of the loop is related to the bandwidth of the AGC loop. By perturbing the AGC loop with a step-like change in the $V_{in}$ term, the loop performance can be gauged by observing the output response time. A typical prior art response is shown in FIG. 3, in which FIG. 3(a) is the stepwise input V(in) and FIG. 3(b) is the system's response V(out). The time constant $\tau$ is equal to the reciprocal of the closed loop bandwidth for the first order system described by Equation 1, i.e., is also proportional to $\alpha$. The output signal response is within 37% of its steady state value after one time constant as illustrated in FIG. 3.

The loop gain, the automatic gain control bandwidth, is proportional to the "$V_{in}\alpha$" product. Due to media and head variations, a 7-fold variation in the signal amplitude of $V_{in}$ is not uncommon. The variation in $\alpha$ is also large, due to the large variation in operating points in variable gain control voltage, and the non-linearity of the usual gain control element. One solution to limit the resultant variation in loop gain would be to set the worst case minimum bandwidth of the automatic gain control higher than the vertical mode instability mechanical resonance frequency of the servo head. This would effectively remove the amplitude variation due to the resonance effect, but then the maximum worst case bandwidth of the automatic gain control would be in violation of the sampling rate criteria of the encoded servo position information on the disc. Therefore, it would clearly be desirable to devise an AGC circuit in which the loop gain function did not depend on $V_{in}$ or on $\alpha$. Such a circuit would provide a constant bandwidth automatic gain control loop.

Figure 4:
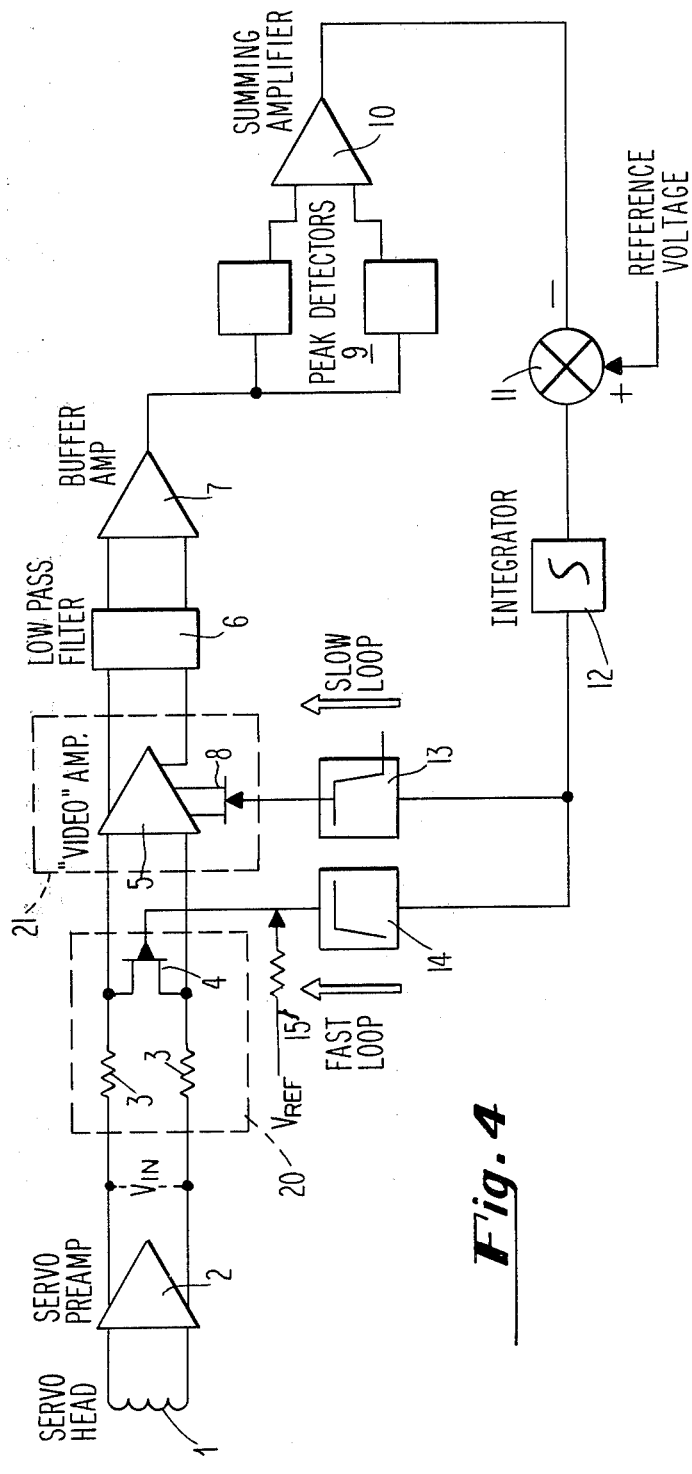
FIG. 4 shows a block diagram of the automatic gain control according to the invention comparable to FIG. 1.

The circuit of the invention, which is a constant bandwidth automatic gain control circuit, is shown in FIG. 4. Gain control is accomplished by use of two variable gain elements to control two AGC loops, a "fast" loop and a "slow" loop. The signal from servo head 1 is first preamplified in preamp 2, and then passed to a first variable gain element 20. This is used in an attenuator configuration consisting of two attenuator resistors 3 and a P-type junction field effect transistor (J-FET) 4 used as a variable resistance device. The other variable gain element 21, comprises an N-type J-FET 8, used as the emitter degeneration resistance of a differential amplifier encompassed within a wide bandwidth or "video" amplifier 5. The constant bandwidth automatic gain control according to the invention can be implemented with other forms of variable gain elements such as transconductance amplifiers, multipliers or any other square-law device, and is not limited to field effect transistors. The variable gain element 20 used in the attenuator configuration is set to a fixed DC attenuation by a reference voltage $V_{ref}$ supplied at 15 when an AC signal is passed to the voltage controlling port (the gate of J-FET 4) through the action of a high pass filter 14. Thus, for steady-state input signals from preamp 2, the gain control element 20 in the attenuator configuration provides a constant attenuation for low-frequency signal variation.

Under the circumstance of a signal of steady-state amplitude received from preamp 2, the second gain control element, J-FET 8, used between two emitter legs of a differential amplifier contained in the video amplifier 5 is controlled via the slow loop to adjust the gain of the video amplifier until the sum of peak detectors 9 (which are as in the prior art embodiment of FIG. 1) equals a predetermined reference voltage supplied to a summing network 11. Thus, no additional change of the output of integrator 12 takes place. The response time of the automatic gain control or slow loop consisting of video amplifier 5, low pass filter 6, (for noise filtration) buffer amplifier 7, peak detectors 9, summing amplifier 10, summing network 11, integrator 12, lag-lead compensator 13 (i.e. a compensator having a gain varying with input signal frequency) and N-FET 8, is not constant, but can be set such that the maximum worst case bandwidth is much lower than the fast loop bandwidth. The linear motor is controlled as in the circuit of FIG. 1, by the signals present at the output of the peak detectors 9.

The fast loop automatic gain control circuit uses most of the slow loop, and consists of the attenuator action of attenuator resistors 3, field effect transistor 4, fixed average gain video amp 5, low pass filter 6, buffer amplifier 7, peak detectors 9, summing amplifier 10, summing network 11, integrator 12 and high pass filter 14.

Figure 5:
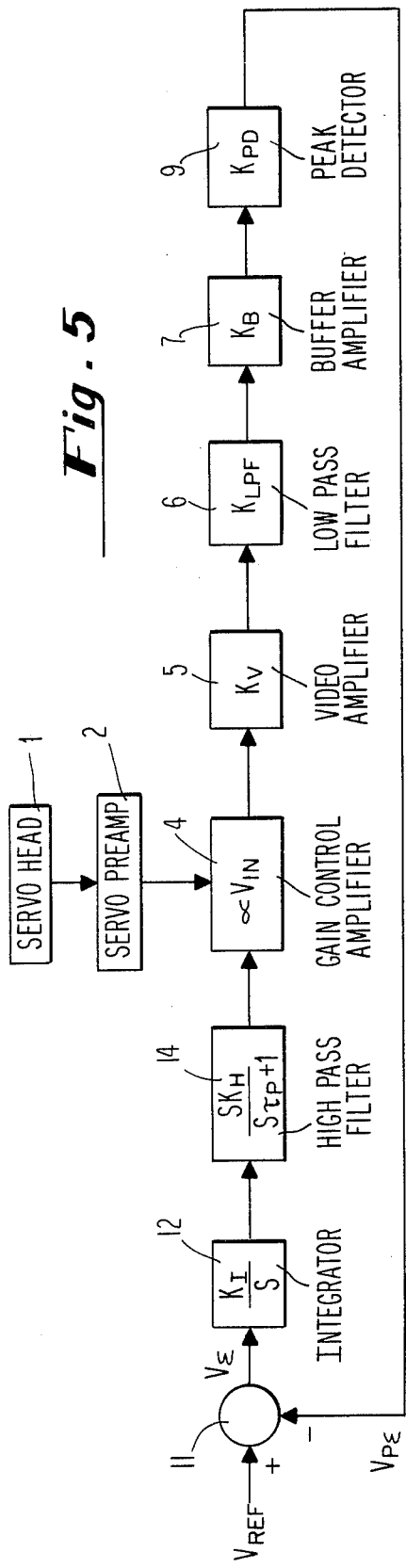
FIG. 5 shows a diagram comparable to FIG. 2, useful in analyzing the bandwidth of the automatic gain control according to the invention.

A block diagram of the fast loop for small signal perturbation of $V_{in}$ is illustrated in FIG. 5; from the block diagram in FIG. 5, the loop gain expression is calculated by multiplying all blocks around the loop.

$$\text{Loop Gain} = \frac{K_I K_H K_V K_{LPF} K_B K_{PD} \alpha V_{IN}}{S \tau_p + 1} \quad (2)$$

where S is $j\omega$ and $\pi_p$ is the corner frequency of the high pass filter 14.

For a constant $\alpha V_{in}$ product the loop gain cross-over frequency is fixed which would result in the desired constant closed loop bandwidth and a constant step response for a small change in $V_{in}$ amplitude.

For small signal perturbation, the average value at $V_{in}$ is defined by Equation 3.

$$V_{IN} = \frac{V_{REF}}{K_A K_V K_{LPF} K_B K_{PD}} \quad (3)$$

where $K_A$ is the gain of variable gain element 20.

Since all terms in Equation 3 are constants, $V_{in}$ can be treated as a constant.

The term $\alpha$ is calculated by partial differentiation of attenuator 4 output voltage with respect to high pass filter 14 output voltage. Since the reference voltage ($V_{REF}$ 15) is fixed, $\alpha$ is substantially constant, and is independent of $V_{in}$. The $\alpha V_{in}$ product is therefore constant for small signal perturbation of $V_{in}$; this results in the desired constant bandwidth AGC system.

Since $\tau$ for the system is the reciprocal of closed loop bandwidth, Equation 4 defines $\tau$.

$$\tau = \frac{K_A \tau_p}{K_I K_H \alpha V_{REF}} \quad (4)$$

Equation 4 is obtained by substituting Equation 3 into Equation 2 and then taking the reciprocal of the gain crossover frequency in radians/sec.

The placement of the variable gain control elements is not limited to the preferred embodiment. The fast loop variable gain element could be interchanged with the slow loop variable gain element and the overall system for small perturbations of $V_{in}$ would exhibit constant bandwidth.

It will be appreciated that there has been described an automatic gain control circuit which features fast and slow loops each controlling a variable gain element by the appropriate use of low and high pass filters. One loop (the slow loop) responds to substantially low frequency (i.e. below 1 kHz) variations in the input signal, while the other, comparatively fast loop responds to high frequency (1–20 kHz) perturbations in the signal. In this way the effect of these perturbations on the control signal used to servo the motion of the read head with respect to magnetic disks can be eliminated and improved accuracy in the control of these positions can be achieved.

In the preferred embodiment a video amplifier is used to respond to the slowly varying dc component of the input signal. This is compared with a reference voltage which is used in turn to generate a servo signal used to drive the linear motor which moves the carriage carrying the heads back and forth with respect to the disk. At the same time, fast oscillations in the system caused by mechanical resonances and the like are controlled by means of a high pass filter to control the conductance of a J-FET which serves to attenuate the incoming signal to reduce the effects of these perturbations on the servo loop. In this way, increased stability and accuracy of operation of the servo loop and hence of the magnetic disk storage apparatus within which it is used are improved. In the particularly preferred embodiment which is shown with respect to FIGS. 4 and 5, the nonlinear response characteristics of the J-FET 4 used to attenuate the input signal is controlled by biasing the J-FET 4 by use of the reference voltage $V_{ref}$ supplied at 15. In this way the nonlinearity of this circuit element is de-emphasized and removed from the gain equation. Similarly, the slow loop is used for correction of large low-frequency variations in $V_{in}$, again so as to ensure stability to the circuit and to allow for constant closed loop bandwidth, which in turn permits constant stepwise response for changes in the amplitude of the incoming signal $V_{in}$.

Therefore, it will be understood by those skilled in the art that there are other modifications and embodiments of the invention which nevertheless fall within its spirit and scope which is as defined by the following claims.

What is claimed is:

1. In apparatus for the control of the position of a recording head with respect to a magnetic data storage media, said position being controlled by drive means, said drive means being controlled by a servo system, said servo system receiving signals from one of said magnetic disks and comprising an automatic gain control circuit for control of amplification applied to said servo data, the improvement which comprises said automatic gain control circuit comprising first and second gain control loops, each of said loops comprising a variable gain element, one of said variable gain elements responding to substantially slower variations in the amplitude of said servo signals and one of said loops responding to substantially faster variations in the amplitude of said input signal, whereby the automatic gain control circuit of said servo loop is of substantially constant bandwidth.

2. The apparatus of claim 1 wherein said variable gain elements comprise field effect transistors.

3. The apparatus of claim 2 wherein the field effect transistor in said fast loop is supplied with said servo signals after said signals have been filtered by a high pass filter.

4. The apparatus of claim 2 wherein the field effect transistor in said slow loop is connected between emitter legs of a differential amplifier comprised in a video amplifier used to amplify said servo signals.

5. The apparatus of claim 4 in which said field effect transistor is controlled by means of a lag lead compensator.

6. A method of applying automatic gain control of substantially constant bandwidth to servo signal used to control the motion of magnetic read and write heads with respect to magnetic data storage media comprising the steps of amplifying said servo signals read from said magnetic disk media by a servo read head, said amplification being varied by automatic gain control means, said variation being performed by a plurality of gain control elements, one of said gain control elements being adapted to control said gain in response to relatively lower frequency variations in the amplitude of said servo signals and another of said gain control elements being controlled to vary the gain applied to said servo signals in response to substantially higher frequency variations in the amplitude of said servo signals.

7. The method of claim 6 wherein said variable gain control elements comprise field effect transistors.

8. The apparatus of claim 7 in which said high frequency signals are used to control the first one of said field effect transistors by application of a high pass filter to said signals.

9. The apparatus of claim 7 wherein said low frequency signals are used to control one of said field effect transistors by application of a lag lead compensator to said signals.

10. The method of claim 6 in which the one of said variable gain elements responsive to said low frequency signals is biased by a substantially constant reference voltage so that its response is substantially linear.

* * * * *